United States Patent [19]

Durand et al.

[11] 4,085,055

[45] Apr. 18, 1978

[54] GRAFTED COPOLYMERS AND THEIR USE AS ADDITIVES FOR LUBRICATING OILS

[75] Inventors: Jean-Pierre Durand, Chatou; Patrick Gateau, Trappes; François Dawans, Bougival; Bernard Chauvel, Ermont, all of France

[73] Assignees: Institut Francais du Petrole; Rhone Poulenc Industries, both of Rueil-Malmaison, France

[21] Appl. No.: 637,393

[22] Filed: Dec. 3, 1975

[30] Foreign Application Priority Data

Dec. 3, 1974 France .................................. 74 39511

[51] Int. Cl.$^2$ ................................................ C10M 1/32
[52] U.S. Cl. .................................. 252/50; 252/51.5 R; 260/879
[58] Field of Search ........................... 252/50, 51.5 R; 260/879

[56] References Cited

U.S. PATENT DOCUMENTS

| | | | |
|---|---|---|---|
| 2,838,456 | 6/1958 | Banes et al. ............................ | 252/50 |
| 3,352,808 | 11/1967 | Leibowitz et al. ............... | 260/879 X |
| 3,360,506 | 12/1967 | De Benneville et al. ......... | 252/50 X |
| 3,378,492 | 4/1968 | Song et al. .......................... | 252/50 X |
| 3,481,923 | 12/1969 | Naarmann ....................... | 260/879 X |
| 3,739,042 | 6/1973 | Chu et al. ........................ | 260/879 X |
| 3,766,300 | 10/1973 | De La Mare ....................... | 260/879 |

*Primary Examiner*—Delbert E. Gantz
*Assistant Examiner*—Andrew H. Metz
*Attorney, Agent, or Firm*—Millen & White

[57] ABSTRACT

Graft copolymer formed by reacting at least one polymerizable vinyl compound in monomeric or polymerized form, with a hydrogenated polymer or copolymer selected from the hydrogenated homopolymers of conjugated dienes of 4–6 carbon atoms, the hydrogenated copolymers of at least 2 conjugated dienes and the hydrogenated copolymers of styrene and conjugated dienes of 4–6 carbon atoms, said hydrogenated polymer or copolymer having an average molecular weight ranging from 10.000 to 300.000 and a residual olefinic unsaturation lower than 15%.

11 Claims, No Drawings

GRAFTED COPOLYMERS AND THEIR USE AS ADDITIVES FOR LUBRICATING OILS

This invention concerns new polymeric compositions, particularly grafted copolymers, their preparation and their use as additives particularly in view of improving the viscosity index and the dispersing power of lubricating oils.

The use of various polyolefinic additives is already known, in view of improving the viscosity index of lubricating oils, by reducing the viscosity decrease resulting from a temperature increase.

The prior art has also described the use in lubricating oils of polymeric additives which combine the effects of improvement of the dispersing power and improvement of the viscosity index. Thus, for example, the U.S. Pat. No. 3,687,849 discloses for this purpose the addition to lubricating oils of copolymers obtained by grafting various comonomers on olefinic copolymers preliminarily degraded by oxidation, the starting olefinic copolymers being more particularly ethylene-propylene-unconjugated diene terpolymers degraded by action of oxygen at a temperature of at least 140° C.

However, it was of interest to improve the behavior of this type of additive by particularly imparting thereto a better resistance to shearing and an increased efficiency. This is one of the objects of the invention.

Another object of the invention is to provide lubricating compositions having simultaneously an improved viscosity index, dispersing properties and, in some cases, detergent properties as well as satisfactory flow properties at low temperature.

Broadly stated, the graft copolymers of the invention are remarkable in that they are obtained by reacting, in the presence of a compound generating free radicals, a. a hydrogenated polymer or copolymer of conjugated diolefin with b. at least one polymerizable vinyl compound, either as monomer or in a prepolymerized form.

More particularly, the polymeric products used as substrates for grafting consist of:

hydrogenated homopolymers of conjugated dienes having from 4 to 6 carbon atoms;

hydrogenated copolymers of at least two conjugated dienes having from 4 to 6 carbon atoms;

or hydrogenated copolymers of conjugated dienes having from 4 to 6 carbon atoms with styrene;

which have an average molecular weight by weight of from 10,000 to 300,000, preferably from 30,000 to 100,000, and which have been hydrogenated up to a residual olefinic unsaturation lower than 15% and, preferably, from 0 to 5% of the units contained therein.

Examples of grafting substrates are: homopolymers of 1,3-butadiene, isoprene, 1,3-pentadiene, 1,3-dimethyl-butadiene, copolymers formed with at least two of these conjugated dienes and copolymers of the latter with styrene, these homopolymers and copolymers having been hydrogenated up to the abovementioned residual unsaturation degree. More particularly, the hydrogenated polymer used as grafting substrate may be obtained from:

a polymer of 1,3-butadiene, initially containing from 25 to 80% of 1,2 units;

a copolymer containing from 10 to 90% of butadiene units and from 10 to 90% of isoprene units;

a copolymer containing from 20 to 80% of units derived from a conjugated diene having from 4 to 6 carbon atoms and 20 to 80% of styrene units.

These polymers or copolymers may be prepared, for example, in solution in an aliphatic or cycloaliphatic solvent according to various techniques described in the prior art. They are preferably prepared by catalysis in the presence of alkali metals derivatives in order to obtain products having a narrow range of distribution of the molecular weights (ratio of the average molecular weights, by weight and by number: $\overline{Mw}/\overline{Mn}$ lower than 2), and consequently, a better resistance to mechanical shearing.

The hydrogenation may also be conducted according to conventional techniques, for example in the presence of catalysts containing Raney nickel, platinum or palladium, deposited on carbon, or still with systems obtained by reaction of transition metal derivatives, such as nickel or cobalt carboxylates or acetylacetonates, with organoreducing compounds such as organoaluminium or organolithium compounds or their hydrides.

The polymerizable vinyl compounds involved in the invention are more particularly selected from:

a. esters of alcohols having a vinylic unsaturation, for example, vinyl acetate, b. esters of aliphatic monoalcohols, diols or aminalcohols and of carboxylic acids having a vinyl unsaturation, such, for example, as methyl, butyl, dodecyl, stearyl, 2-hydroxy ethyl or diethylaminoethyl acrylates and methacrylates;

c. heterocyclic compounds with vinyl groups such, for example, as N-vinylpyrrolidone, N-vinylimidazole, vinylpyridine or N-methacryloyloxyethylmorpholine;

d. ethers with vinyl groups such, for example, as vinylbutylether;

e. ketones with vinyl groups such for example, as methylvinylketone or ethylvinylketone; and f. amides with vinyl groups such, for example, as N (1,1-dimethyl 3-oxobutyl) acrylamide.

These monomers may be used either alone or as mixtures; for example, mixtures of N-vinylimidazole or N-vinylpyrrolidone with acrylates or methacrylates are particularly convenient in order to obtain graft copolymers having an improved thickening power and improved dispersing properties.

The graft copolymers of the invention may contain 1 to 40% by weight or more of comonomers and, in most cases, contents from 1 to 10 % by weight are sufficient to impart good properties to the additive, this being an advantage of the invention since it is known that most of these comonomers are relatively expensive.

The reaction of grafting a vinyl monomer on a polyolefinic substrate is well known: it has been described, for example, by J. Pavlinec et al. in Journal of Polymer Science, Part C, No. 16, p. 1113 to 1123 (1967). For manufacturing graft copolymers according to the invention, the grafting reaction is conducted preferably on hydrogenated polymers or copolymers dissolved in the solvent which has been used for their preparation, in the presence of compounds generating free radicals, at a temperature usually from 40° to 150° C. Among the radical initiators which can be used, there can be mentioned dicumyl peroxide, ditertiobutyl peroxide, benzoyl peroxide, lauroyl peroxide, cumyl hydroperoxide, tertiobutyl hydroperoxide, azobisisobutyronitrile, sodium persulfate, diethyl peroxydicarbonate, diisopropyl peroxydicarbonate, dicyclohexyl peroxydicarbonate, tertiobutyl peroxypivalate, tertiobutyl perbenzoate, tertiobutyl peroctoate, tertiobutyl peracetate or 2,4-pentadione peroxide. Usually the concentration of radical generators is from 0.5 to 25% by weight of the total weight of comonomers to be grafted. There can also be added various conventional transfer agents such as mercaptans.

According to a particular embodiment of the method of preparation of the graft polymers of the invention, the grafting of one or more comonomers is directly performed with a solution of hydrogenated polymer or copolymer in a lubricating oil, any insoluble homopolymer, when formed, being separated by decantation or centrifugation before the use of the lubricant.

According to another embodiment of the method of preparation of graft copolymers of the invention, macroradicals are preformed, in the presence of a compound generating free radicals, by polymerization of the one or more comonomers in solution in a solvent, so selected that the difference between the solubility parameters of the macroradicals and of the solvent be at least equal to 1.8. (These parameters have been described by H. Barrell in Polymer Handbook, Chap. 4, J. Brandrup and E. H. Immergut Eds Interscience, New-York, 1965). For example, when the comonomer is methyl methacrylate, macroradicals are preformed in hexane. The hydrogenated polymeric substrate is then added, optionally in solution in lubricating oil, and the grafting is performed by continuing the heating of the reaction medium. At the end of the reaction, the light solvent, such as hexane is removed, for example by evaporation under reduced pressure. This embodiment, when possible, has the advantage of a better control of the number and the length of the grafted elements.

The exact structure of the graft copolymers of the inventon is not known, but it is probable that the grafted groups are preferentially fixed on the tertiary carbon atoms of the hydrogenated polymer or copolymer.

The graft copolymers of the invention exhibit a good compatibility with various mineral lubricating oils, such as hydrofined oils or oils refined with solvents, as well as with a number of synthetic lubricating oils. They are advantageously used as additives for improving the viscosity index and/or the dispersing power of lubricating oils.

The lubricating oils of the invention contain accordingly a major proportion of lubricating oil and a sufficient proportion, in view of improving the viscosity index and/or dispersing power thereof, of one or more graft copolymers as above-described. This proportion is generally from 0.1 to 10%, and preferably from 0.5 to 5% by weight.

As compared to the polyolefinic additives described in the prior art, the graft copolymers of the invention usually exhibit an increased efficiency (S) generally higher than 0.8, which indicates that the thickening power of the additive does not vary much with the temperature (the efficiency (S) being defined by the value of the ratio of the specific viscosities of the treated oil respectively at 100 and 0° C). Their mechanical shearing strength is also generally improved: thus, in the test of degradation by shearing, conducted according to method DIN 51 382, in which the oil with added polymer is circulated through the orifice of a Diesel injector, the viscosity loss, after 30 cycles, is generally smaller than 10%. In contrast thereto, it appears that the efficiency of additives derived from ethylene-propylene-diene terpolymers, as described in the prior art, particularly in the above mentioned U.S. Pat. No. 3,687,849, is generally lower. It is, in most cases, close to 0.6 or 0.7. In addition, with respect to the degradation under shearing of these terpolymers, as determined according to the above-mentioned DIN method, the viscosity loss, after 30 cycles, is generally higher than 20%, which means that the improvement of the viscosity index of the lubricant, which initially results from the addition of a polymer of this type, quickly disappears when the engine is used under normal conditions.

The lubricating compositions of the invention may also include other conventional additives, for example, anti-wear agents, agents for lowering the pour point, anti-oxidants, agents improving the viscosity index as well as ashless dispersing agents or detergents.

The invention will be further illustrated by the following examples which are not limitative of the scope thereof. Examples 1 to 6, 8 and 9 form no part of the invention and are given only for comparison purpose.

EXAMPLE 1

To a solution of 50 g of 1,3-butadiene in 500 ml of n-heptane, there is added 0.17 g of tetrahydrofuran and 0.8 millimole of normal butyllithium. The reaction mixture is stirred at 30° C for 4 hours. There is thus obtained a solution containing 48g of polybutadiene. The microstructure of the polymer, determined by I.R. spectrophotometry consists of 66% of 1,2 units and 34% of 1,4 units; the average molecular weight by weight is 90,000 and the ratio of the average molecular weights by weight and in number $\overline{Mw}/\overline{Mn}$ is 1.35. These features are reported in Table I below.

40 g of this polymer is dissolved into benzene and the resulting solution is added to 360 g of a lubricating oil of the 200 Neutral type. Benzene is then evaporated under reduced pressure, up to a constant weight.

EXAMPLE 2

Example 1 is repeated. At the end of the polymerization, there is added a suspension resulting from the reaction of 11.6 mg of cobalt, in the form of cobalt octoate, with 67 mg of triethyl aluminium. The reaction vessel is stirred at 90° C for 2 hours under a hydrogen pressure close to 25 bars. The polymer is then separated by precipitation of the reaction solution in an excess of isopropyl alcohol and dried under reduced pressure up to constant weight. There is thus obtained 49 g of hydrogenated polybutadiene having a residual unsaturation content lower than 3 moles %.

40 g of this polymer is dissolved into benzene and the resulting solution is added to 360 g of a lubricating oil of the 200 Neutral type. Benzene is then evaporated, under reduced pressure, up to constant weight.

The 10 % by weight solution of polymer in oil thus obtained is then added to a 200 Neutral oil in a sufficient proportion to raise the viscosity at 98.9° C of said oil to 15 cSt (20% by weight of siad solution has been added, i.e. 2% by weight of polymeric additive). The resulting composition exhibits properties which are given by way of comparison in Table 2 and show a good behaviour to shearing and oxidation, but no dispersing power.

EXAMPLE 3

1.27 g of tetrahydrofuran and 6 mMoles of n-butyllithium are added to a solution of 50 of/g/1,3-butadiene in 500 ml of n-heptane. The reaction mixture is stirred at 30° C for 3 hours. There is thus obtained a solution containing 48g of a polybutadiene whose microstructure, determined by I.R. R. spectrophotometry, consists of 65% of 1,2 units and 35% of 1,4 units. The average molecular weight by weight is 11,000 and the ratio of the average molecular weights by weight and in number $\overline{Mw}/\overline{Mn}$ is 1.35 (Table I). The polymer is then hydrogenated and dissolved in a proportion of 10% by weight into a lubricating oil of the 200 Neutral type, as described in Example 2.

EXAMPLES 4 to 6

Butadiene-styrene, butadiene-isoprene and isoprene-styrene copolymers have been prepared according to the anionic method in the presence of butyllithium, and then hydrogenated in a manner similar to that described in Example 2. The characteristics of these copolymers are reported in Table I

TABLE I

| Additive of example | COMPOSITION (MOLE %) | | | $\overline{Mw}$ | $\overline{Mw}/\overline{Mn}$ |
| --- | --- | --- | --- | --- | --- |
| | Butadiene | Isoprene | Styrene | | |
| 2 | 100 | — | — | 90.000 | 1.35 |
| 3 | 100 | — | — | 11.000 | 1.35 |
| 4 | 50 | — | 50 | 80.000 | 1.30 |
| 5 | — | 50 | 50 | 85.000 | 1.25 |
| 6 | 65 | 35 | — | 90.000 | 1.30 |

The residual olefinic unsaturation of each of these hydrogenated copolymers is lower than 3%.

These different copolymers are added to a 200 Neutral lubricating oil as in example 2. The characteristics of the resulting compositions, reported in table 2, show a good resistance to shearing, but the absence of dispersing power.

EXAMPLE 7

To 90 g of the solution of the polymer of Example 2 in a 200 Neutral oil, there is added 0.34 g of N-vinyl imidazole, 0.66 g of methyl methacrylate and 0.2 g of tertiobutyl perbenzoate. The mixture is stirred at 130° C; there is added two times 0.04 g of tertiobutyl perbenzoate (first after one hour and then after 3 hours of reaction), the total reaction time being 8 hours.

Certain characteristics of the 200 Neutral oil containing 20% by weight of the resulting solution are summarized in Table 2. It can be observed that the dispersing power is satisfactory, as well at 200° C as after cooling to 20° C, and that the efficiency is improved, without however resulting in a significant decrease of the shearing strength and of the resistance to oxidation.

EXAMPLE 8

When example 7 is repeated, except that the solution of polymer of example 2 is replaced by that of example 1, there is obtained a lubricating composition whose characteristics, summarized in Table 2, show, in addition to a decrease of efficiency, a very poor resistance to oxidation due to the unsaturation of the non-hydrogenated polybutadiene; this defect excludes such a composition from the scope of the invention.

EXAMPLE 9

When example 7 is repeated, except that the solution of polymer of example 2 is replaced by that of example 3, there is obtained a composition which, on the one hand, requires the use of a too large proportion of polymeric additive (more than 10% by weight with respect to the lubricating oil) in order to obtain the desired viscosity (15 cSt) at 98.9° C, and, on the other hand, has a too low viscosity index (VIE = 120) for including this formulation in the scope of the invention.

EXAMPLE 10

When example 7 is repeated except that N-vinyl-imidazole is replaced by N-vinyl pyrrolidone, there is obtained a lubricating composition whose characteristics, summarized in Table 2, are close to those of example 7.

EXAMPLE 11

To 90 g of the solution of example 2, there is added 0.2 g of N-vinyl imidazole and 0.04 g of tertiobutyl perbenzoate. The mixture is stirred for 7 hours at 130° C.

The characteristics of a 200 Neutral oil to which 20% by weight of the resulting solution has been added, are summarized in Table 2. They show the evidence of a satisfactory dispersing power.

EXAMPLE 12

To 90 g of a 200 Neutral lubricating oil solution containing 9 g of the hydrogenated butadiene-styrene copolymer of example 4, there is added 0.9 g of diethylamino-ethyl methacrylate and 50 mg of azobisisobutyronitrile. The reaction mixture is stirred for 6 hours at 130° C.

The characteristics of the 200 Neutral oil to which there has been added 20% by weight of the resulting solution are summarized in Table 2. They show also a noticeable improvement of the dispersing power.

EXAMPLE 13

Example 7 is repeated, except that the hydrogenated polybutadiene is replaced by the hydrogenated isoprene-styrene copolymer of Example 5, and there is obtained a lubricating composition whose characteristics summarized in table 2, are close to those of example 7.

EXAMPLE 14

To 90 g of a solution of 200 Neutral lubricating oil containing 9 g of hydrogenated butadiene-isoprene copolymer of example 6, there is added 0.34 g of methyl methacrylate, 0.66 g of butyl-vinyl-ether and 0.2 g of tertiobutyl perbenzoate. The reaction mixture is stirred for 7 hours at 130° C.

Certain characteristics of the 200 Neutral oil to which the resulting solution has been added, in a sufficient amount to obtain the desired viscosity at 98.9° C (20% by weight), are summarized in table 2.

EXAMPLE 15

Example 11 is repeated except that N-vinyl-imidazole is replaced by N-vinyl pyrrolidone, and there is thus obtained a lubricating composition whose characteristics, summarized in Table 2, are close to those of the composition of example 11.

EXAMPLE 16

To 320 g of the solution in 200 Neutral oil, of the polymer of example 2, there is added 0.33 g of N-vinyl-imidazole, 0.66 g of methyl methacrylate and 0.15 g of tertiobutyl perbenzoate. The reaction mixture is stirred for 7 hours at 130° C. Certain characteristics of the 200 Neutral oil containing said solution in a sufficient amount for obtaining the desired viscosity at 98.9° C, are summarized in Table 2.

EXAMPLE 17

Example 16 is repeated except that N-vinyl-imidazole is replaced by N-vinyl-pyrrolidone, and there is obtained a lubricating composition whose characteristics, summarized in Table 2, are close to those of the composition of example 16.

TABLE 2

| | (a) Concentration of additive % b.w. | (b) VIE | (c) Efficiency | (d) Partial Shearing (%) | STABILITY to OXIDATION (e) | | | DISPERSING POWER (f) | |
|---|---|---|---|---|---|---|---|---|---|
| | | | | | Induction period (min) | Absorbed O$_2$ after 7 h (mole/l) | Viscosity variation (%) | (A) | (B) |
| without | 0 | 100 | | | 260 | 0.9 | + 35 | | |
| 2 | 2 | 140 | 0.70 | 6 | 300 | 0.3 | − 6 | 0.40 | 0.33 |
| 4 | 2 | 136 | 0.74 | 5 | 290 | 0.4 | − 8 | 0.39 | 0.34 |
| 5 | 2 | 134 | 0.72 | 5.5 | 310 | 0.3 | − 7 | 0.40 | 0.36 |
| 6 | 2 | 142 | 0.68 | 8 | 310 | 0.3 | − 6 | 0.41 | 0.35 |
| 7 | 2 | 151 | 0.96 | 7 | 250 | 0.4 | − 10 | 0.70 | 0.70 |
| 8 | 2 | 140 | 0.70 | 9 | 35 | 1* | − 39 * | 0.68 | 0.68 |
| 9 | >10 | 120 | 0.60 | 5 | 200 | 0.5 | − 12 | 0.74 | 0.73 |
| 10 | 2 | 145 | 0.94 | 8 | 350 | 0.2 | − 5 | 0.70 | 0.70 |
| 11 | 2 | 142 | 0.75 | 7 | 300 | 0.3 | − 7 | 0.71 | 0.71 |
| 12 | 2 | 140 | 0.80 | 6.5 | 310 | 0.4 | − 9 | 0.65 | 0.66 |
| 13 | 2 | 139 | 0.80 | 6 | 250 | 0.4 | − 10 | 0.69 | 0.70 |
| 14 | 2 | 145 | 0.84 | 9.5 | 260 | 0.4 | − 10 | 0.60 | 0.60 |
| 15 | 2 | 140 | 0.73 | 7 | 280 | 0.3 | − 8 | 0.72 | 0.70 |
| 16 | 2 | 146 | 0.87 | 6 | 270 | 0.4 | − 8 | 0.71 | 0.72 |
| 17 | 2 | 146 | 0.88 | 6 | 320 | 0.2 | − 6 | 0.67 | 0.67 |

* Test discontinued after 2 hours.
(a) Concentration of additive in the lubricating oil to obtain the viscosity of 15 cSt at 98.9° C.
(b) Calculated according to ASTM D 2270 standard.
(c) Ratio of specific viscosities determined by capillarity at 100° C and 0° C.
(d) Viscosity drop due to ORBAHN shearing of the polymer, after 30 cycles, determined by DIN 51 382 Standard.
(e) Measurement, in relation to time, of the absorbed oxygen at 150° C and of the viscosity of an oil containing the polymeric additive and 0.4 % of 4,4-methylene-bis (2,6-ditertiobutylphenol) in the presence of 24 ppm Fe, 24 ppm Cu and 24 ppm Pb in the form of naphthenates.
(f) Ratio of the diameters after 24 hours (diameter of the carbon black spot/diameter of the oil spot) of the two coaxial spots formed when depositing a drop of oil containing the additive and carbon black on a sheet of filter paper, according to the spot method described by GATES V.A. et al. in SAE Preprint 572 (1955) or by A.Schilling in "Les huiles pour moteurs et le graissage des moteurs" Eds Technip, Tome 1, P. 89 (1962). The results (A) are determined at 200° C and (B) after cooling to 20° C.

We claim:

1. A graft copolymer of:
   a. a substrate consisting essentially of a hydrogenated polymer or copolymer selected from the group consisting of (a) homopolymers of conjugated dienes having from 4 to 6 carbon atoms, (b) copolymers of at least two conjugated dienes having from 4 to 6 carbon atoms, (c) and copolymers of conjugated dienes having from 4 to 6 carbon atoms with styrene, said hydrogenated polymer or copolymer having after hydrogenation a residual olefinic unsaturation of from 0 to 5% of the units contained therein, a weight average molecular weight from 30,000 to 100,000 and a distribution of the molecular weights defined by a ratio $\overline{M_w}/\overline{M_n}$ lower than 2, and
   b. graft polymerized chains of at least one vinyl compound selected from the group consisting of N-vinylpyrrolidone, N-vinylimidazole and vinylpyridine.

2. A graft copolymer according to claim 1, in which said hydrogenated polymer is obtained from a polymer of 1,3-butadiene containing from 25 to 80% of 1,2 units.

3. A graft copolymer according to claim 1, in which said hydrogenated copolymer is obtained from a copolymer containing from 10 to 90% of butadiene units and from 10 to 90% of isoprene units.

4. A graft copolymer according to claim 1, in which said hydrogenated copolymer is obtained from a copolymer containing from 20 to 80% of units derivating from at least one conjugated diene having from 4 to 6 carbon atoms and from 20 to 80% of styrene units.

5. A graft copolymer according to claim 1, in which said at least one vinyl compound comprises N-vinylimidazole.

6. A grafted copolymer according to claim 1, in which the proportion of the graft polymerized chain of vinyl compound is from 1 to 40% by weight.

7. A graft copolymer according to claim 1, in which the proportion of the graft polymerized chain of vinyl compound is from 1 to 10% by weight.

8. A graft copolymer according to claim 1 wherein said at least one vinyl compound comprises N-vinylpyrrolidone.

9. A lubricating composition comprising a major proportion of lubricating oil and a proportion of at least one graft copolymer according to claim 1, which is sufficient to improve both the viscosity index and the dispersing power of said lubricating oil.

10. A composition according to claim 9, in which the proportion of graft copolymer is from 0.1 to 10% by weight.

11. A composition according to claim 9, in which the proportion of graft copolymer is from 0.5 to 5% by weight.

* * * * *

UNITED STATES PATENT AND TRADEMARK OFFICE
CERTIFICATE OF CORRECTION

PATENT NO. : 4,085,055
DATED : April 18, 1978
INVENTOR(S) : Jean-Pierre Durand et al.

It is certified that error appears in the above-identified patent and that said Letters Patent are hereby corrected as shown below:

Claim 3, Line 57: reads "from a co"
should read--from a copolymer (thru the end of the claim)--

Claim 4: is completely missing and should be inserted to read as follows:

--A graft copolymer according to claim 1, in which said hydrogenated copolymer is obtained from a copolymer containing from 20 to 80% of units derivating from at least one conjugated diene having from 4 to 6 carbon atoms and from 20 to 80% of styrene units.--

Signed and Sealed this

Twenty-ninth Day of August 1978

[SEAL]

Attest:

RUTH C. MASON
Attesting Officer

DONALD W. BANNER
Commissioner of Patents and Trademarks